Nov. 14, 1939.   D. G. CHASE   2,179,713
ROTARY SNOW PLOW
Filed May 20, 1938   2 Sheets-Sheet 1

Nov. 14, 1939.  D. G. CHASE  2,179,713
ROTARY SNOW PLOW
Filed May 20, 1938  2 Sheets-Sheet 2
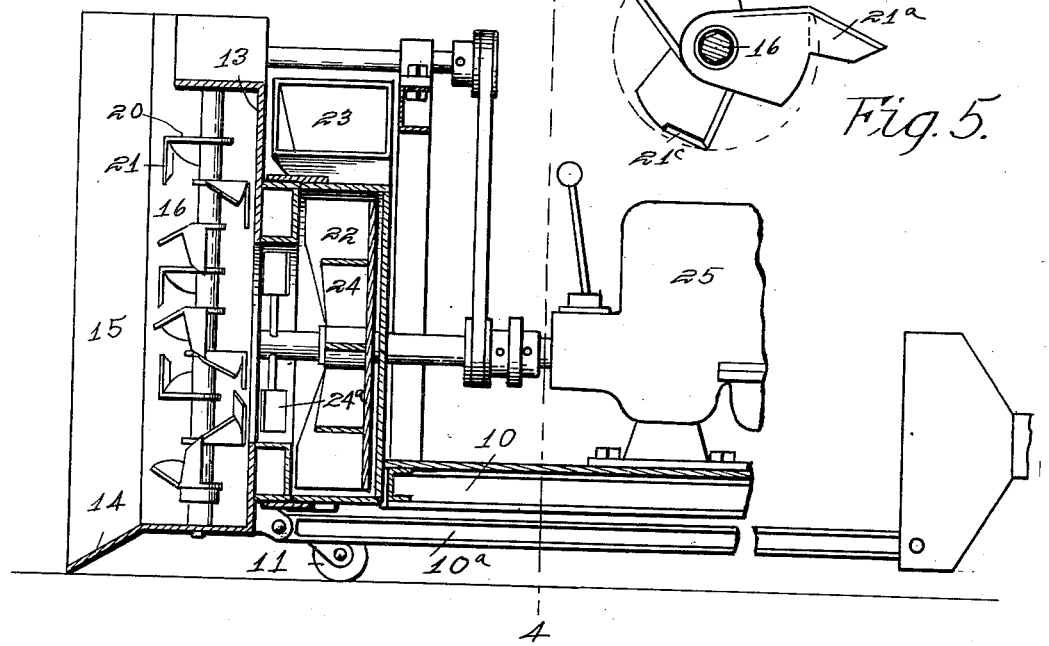
Fig. 3.
Fig. 5.
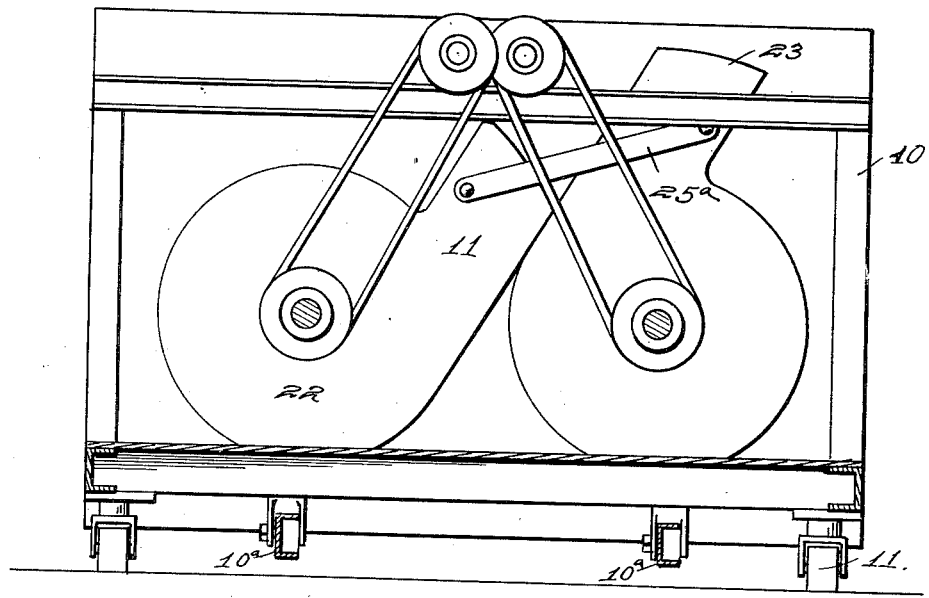
Fig. 4.
Inventor
David G. Chase
by Orwig & Hague Att's Patented Nov. 14, 1939

2,179,713

UNITED STATES PATENT OFFICE 2,179,713

ROTARY SNOW PLOW

David G. Chase, Adel, Iowa

Application May 20, 1938, Serial No. 209,058

5 Claims. (Cl. 37—43)

My invention relates to the art of removing snow and ice from roadways. It is especially designed for use under extreme conditions such, for instance, as when the snow is in deep drifts or tightly packed, or when it has been partially or fully formed into ice.

My object is to provide an implement of this class in which the entire front of the implement is covered with snow and ice cutting blades so arranged and constructed that as the implement is advanced, any snow or ice with which it comes in contact will be cut into small pieces which are easily removable, and further to so construct the cutting blades that they will move the small pieces of snow and ice toward a centrally arranged discharge opening, lifting them upwardly from the lower edge of the implement, pulling them downwardly from the upper edge and inwardly from the side edges, whereby the entire mass of snow or ice with which the implement comes in contact, regardless of the depth or condition, will be cut into small pieces and delivered to a point of discharge.

A further object is to provide an implement of this class in the form of a single unit in which all of the snow and ice cutting and removing mechanism, and the engines for operating same, are mounted upon a frame with supporting wheels so that the implement may be readily and quickly coupled to any truck or tractor and the power for operating the snow or ice cutting and discharging mechanism may be operated independently of the power for operating the truck or tractor.

In the accompanying drawings Figure 1 shows a plan view of my improved implement;

Figure 3 shows a vertical longitudinal sectional view of same;

Figure 4 shows a rear elevation of same; and

Figure 5 shows a horizontal sectional view of one of the cutter supporting shafts looking upwardly to illustrate the arrangement of the cutters thereon.

Figure 1:
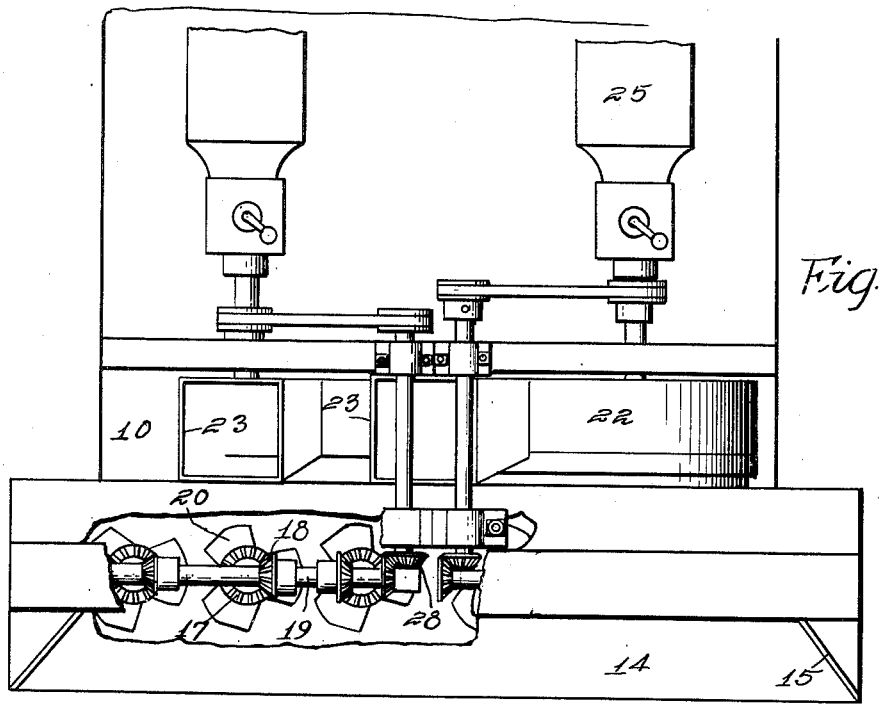
Figure 2:
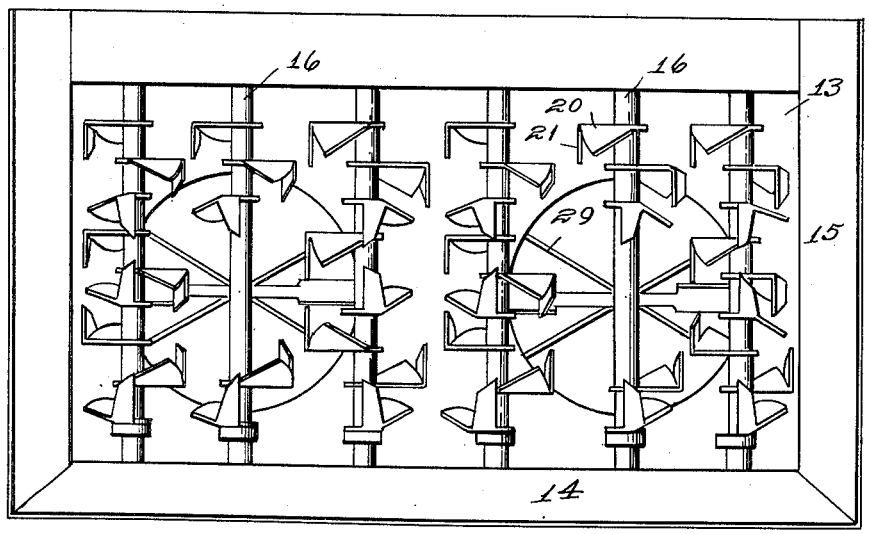
Figure 2 shows a front elevation of same.

Referring to the accompanying drawings I have used the reference numeral 10 to indicate generally the frame of the implement. This frame is supported by four swiveled wheels 11 and may be attached to any power operated vehicle, such as an autombile truck, and steered by the truck driver by means of push rods 10a pivoted to the frame 10.

At the front of the implement is an upright plate 13 having two circular openings formed therein through which material may be delivered to the fans in the rear. At the lower edge of the plate 13 is a scraper blade 14 extended downwardly and forwardly, and at each side is a stationary upright cutter blade 15 projected forwardly and outwardly.

In front of the plate 13 is a series of six upright shafts 16 rotatably mounted and spaced apart approximately equi-distant; at the upper end of each shaft is a bevel gear 17 in mesh with a bevel gear 18 fixed to a rotatable shaft 19. There are two of these shafts 19 and they are independently driven, as will be hereinafter described. Each shaft 19 is geared to three of the upright shafts 16.

On each of the shafts 16 there is a series of material cutting and moving blades 20. Each blade is extended radially from the shaft and is substantially segmental as viewed from the top. Its advance edge forms a cutter and its body portion is inclined in the form of a spiral. At the outer edge of the blade adjacent its cutting edge is a cutter blade 21 arranged substantially parallel to the shaft. I preferably form these blades in the flat metal, as shown at 21a in Fig. 5, and later the blade 21 is bent to the position shown in Fig. 5 at 21c. One of the important features of these cutting blades is, that the outer edge of each blade is relatively long at its advance or cutting edge and is progressively shorter toward its rear edge, as clearly illustrated in Fig. 5, and the outer face of the blade member 21a is inclined from a maximum distance from the shaft 16 at its forward or cutting edge, to a minimum distance from the shaft 16 at its rear edge.

By this novel construction of the cutting blades an important result is attained. Assuming that the machine was being forced by a tractor moving at slow, uniform speed, into a bank of tightly packed snow or even ice, the forward or cutting edge of each blade will cut through the ice as the machine is advancing, and the remaining portion of the blades will not engage the wall of uncut ice, hence, the steady advance of the machine will not be retarded, and there will be no friction upon the wall of uncut ice such as would occur if the rear edges of the blade were as long as the front edges. By having the blades 21a at the outer end of each blade 20, the ice is cut vertically from the path of one of the blades 20 to aproximately the path of the next blade 20, and the shafts and blades are so close together as to cut or shave off practically every particle of a wall of ice into which it is moved.

One shaft 16 is positioned directly in front of each of the said circular openings in the plate 15, and I preferably omit the blades 20 from the portion of the shaft 16 directly in front of the opening. The blades 20 at the lower portion of the shaft have portions thereof arranged in the form of an ascending spiral and those at the upper portions of the shaft in the form of a descending spiral relative to the direction of rotation of the shaft to which they are fixed. The shafts on opposite sides of the shaft directly in front of the discharge opening are geared to rotate in the direction in which the front edges of the cutters move toward the adjacent fan opening.

The relative positions of the shafts 16 and the lengths of the cutter blades are such that the paths of travel of the cutter blades are such that they approximately cover the entire area of the front of the implement, the blades of two adjacent shafts come as close together as is practicable without actually touching each other.

The adjacent blades on each shaft are spaced apart a substantial distance so that each cutting edge will engage a different part of the material being operated on and so that cut-away particles of snow or ice may move between the blades to a point of discharge.

At the rear of each of the openings in the plate 13 is a cylindrical fan housing 22, open at its front and having a tangentially arranged discharge spout 23. A fan 24 is mounted in this fan housing, and the fan shaft is projected forwardly, and fixed to the front end is a cutter blade 24a to operate in the forward end of the cylindrical fan casing. These fan housings are rotatably supported upon the fan shafts, and the fan spouts are arranged to discharge in the same direction. I have provided a link 25a pivoted to both fan housings for jointly holding the fan spouts at the same inclination either toward the right or left of the machine and whereby the operator may grasp either fan housing and adjust its inclination and the other fan housing will be moved correspondingly.

For operating the fan and rotary cutters I have provided an engine 25 for each fan and group of cutters. Each engine is directly connected to the corresponding fan and is indirectly connected with the shaft 19 of the cutter elements through a gearing device, indicated generally by the reference numeral 28, and inclined pulleys and a belt. By this means the operator may independently control the operation of the fans and their associated cutters to operate them jointly or either one independently.

In practice I have found that with an implement of this class it is highly desirable to have it ready for instant use when an emergency arises. For this reason I have provided an implement in the form of a self-contained unit, at all times ready for instant use. It is only necessary to couple a truck or tractor to it and start the engines 25. The implement is accurately steered by the truck operator so that the operator of the implement need only control the speed of the engines 25 and direct the operator of the truck as to the proper speed and direction of travel.

Assuming that a highway is covered by a relatively thick layer of snow of uniform depth, then my implement may be advanced rapidly, the scraper 14 and the stationary cutters 15 direct the snow toward the rotary cutting and material moving blades 20. It may be moved so rapidly that the snow may be piled up in front of the implement as high as the top of the implement and yet the cutters and fans will remove it and discharge it to a point distant from the highway.

My improvement is, however, especially desirable for use under extreme or unusual conditions. To illustrate: When a fine snow is driven by a high wind, deep drifts occur on the highway, and in some instances sand and finely divided soil is mixed with the snow in such manner as to form a firm mass. In addition to this, rain or sleet is added to the snow and thereafter becomes frozen, forming deep masses almost as hard as solid ice. Under such extreme conditions my improved implement will function efficiently. Both engines 25 are operated at full speed and the implement is advanced slowly, each of the rotary cutter blades during its rotation cuts from the mass of material a segmental section and throws it laterally toward the center of the adjacent fan housing, and then the suction from the fan carries it rearwardly between the blades 20 and to a point of discharge. The cutter blades 20 on two adjacent shafts 16 are so close together that any portions of the mass of material not actually touched by the cutter blades will be so thin that the action of the blades will break them down as the implement advances. This cutting action occurs over the entire area of the front of the implement, and the blades which cut away the material at the upper portion are shaped to draw the material downwardly toward the fan openings, the blades at the lower portion draw the material upwardly toward the fan opening, and the cutter blades on the shafts at the side of the fan housing rotate in opposite directions to throw the material toward the center of the fan.

After the implement has made one passage through the snow on a highway, it is frequently desirable to cut away a narrow strip at each side. My implement is especially desirable for this work, the upright blade 15 cuts into the snow and directs it inwardly, and only one engine is operated to cut away and discharge the snow. This blade 15 by being inclined slightly outwardly, serves to draw the implement toward the bank of snow so that the truck driver has no difficulty in holding the implement in a straight path.

I have found that with the snow and ice removing implements now in use, and under the extreme conditions hereinbefore mentioned, the operation of the implement will pack the snow and ice in front of the implement and fail to remove it, and that workmen with hand shovels are frequently necesary under such condition. With my implement, however, the snow and ice may be efficiently removed without the aid of workmen with hand shovels, because under such extreme conditions the implement is advanced slowly, but even when thus advanced, it clears a roadway much faster than could be done by workmen with hand shovels.

I claim as my invention:

1. In a machine of the class described, the combination of a frame to be advanced over a roadway, a rotatable shaft carried by the frame, means for rotating it, a series of material moving blades fixed to the shaft, said blades being projected radially from the shaft and having their working faces arranged spirally so that during the rotation of the shaft said working faces will tend to move material longitudinally of the shaft, the working surfaces of said blades being substantially segmental in shape and said blades being widely spaced apart upon the shaft so that material may move longitudinally of the shaft between adjacent blades on the same shaft, the outer edges of the blades from the advance edge to the rear edge being of progressively less diameter to thereby permit the machine to advance against relatively solid material between the time that the advance edge of a blade engages the material and the time that the rear edge of the same blade passes rearwardly beyond the material being cut, and a cutting blade adjacent the advance edge and outer periphery of the aforesaid blades, and extended substantially parallel with the shaft.

2. In a machine of the class described, the combination of a frame to be advanced over a roadway, a rotatable shaft carried by the frame, means for rotating it, a series of material moving blades fixed to the shaft, said blades being projected radially from the shaft and having their working faces arranged spirally so that during the rotation of the shaft said working faces will tend to move material longitudinally of the shaft, the working surfaces of said blades being substantially segmental in shape and said blades being widely spaced apart upon the shaft so that material may move longitudinally of the shaft between adjacent blades on the same shaft, the outer edges of the blades from the advance edge to the rear edge being of progressively less diameter to thereby permit the machine to advance against relatively solid material between the time that the advance edge of a blade engages the material and the time that the rear edge of the same blade passes rearwardly beyond the material being cut, the peripheral edge of the blade being extended to a position substantially parallel with the shaft and being sharpened at its advance edge.

3. In a machine of the class described, the combination of a frame to be advanced over a roadway, a rotatable shaft carried by the frame, means for rotating it, a series of material moving blades fixed to the shaft, said blades being projected radially from the shaft and having their working faces arranged spirally so that during the rotation of the shaft said working faces will tend to move material longitudinally of the shaft, the working surfaces of said blades being substantially segmental in shape the said blades being widely spaced apart upon the shaft so that material may move longitudinally of the shaft between adjacent blades on the same shaft, the outer edges of the blades from the advance edge to the rear edge being of progressively less diameter to thereby permit the machine to advance against relatively solid material between the time that the advance edge of a blade engages the material and the time that the rear edge of the same blade passes rearwardly beyond the material being cut, and means for creating a blast of air moving rearwardly around the blades to remove material between and around the blades.

4. In a machine of the class described, the combination of a frame to be advanced over a roadway, a series of upright rotatable shafts mounted in the frame, means for rotating some of the shafts in one direction and some of the shafts in the reverse direction, a series of material moving blades fixed to each shaft, said blades being projected radially from the shaft and having their working faces arranged spirally so that during the rotation of the shaft said work faces will tend to move material longitudinally of the shaft, the working surfaces of said blades being substantially segmental in shape and said blades being widely spaced apart upon the shaft so that material may move longitudinally of the shaft between adjacent blades on the same shaft, the outer edges of the blades from the advance edge to the rear edge being of progressively less diameter to thereby permit the machine to advance against relatively solid material between the time that the advance edge of a blade engages the material and the time that the rear edge of the same blade passes rearwardly beyond the material being cut, a cutting blade adjacent the advance edge and outer periphery of the aforesaid blades and extended substantially parallel with the shaft, the said shafts being so spaced that the paths of travel of their blades will come so close to each other that any uncut material between the blades will be so thin as to be easily broken away upon the further advance of the machine, and means for creating a blast of air moving rearwardly around the blades to remove material between and around the blades.

5. In a machine of the class described, the combination of a frame, supporting wheels therefor, a horizontal scraper at the front of the frame inclined upwardly and rearwardly, upright cutter blades at the sides of the frame inclined inwardly and rearwardly, two blowers carried by the frame and arranged side by side with their inlet openings in the rear of said cutter blades and arranged to discharge material upwardly and laterally, means for operating the blowers, a series of upright rotatable shafts mounted in the frame between said upright cutters and the blowers, spaced apart approximately equi-distant from each other, means for rotating some of the shafts in one direction and others in the opposite direction, a series of material moving blades on each shaft, said blades being projected radially from the shaft and having their working faces arranged spirally so that during the rotation of the shaft said working faces will tend to move material longitudinally of the shaft, the working surfaces of said blades being substantially segmental in shape and said blades being widely spaced apart upon the shaft so that material may move longitudinally of the shaft between adjacent blades on the same shaft, the outer edges of the blades from the advance edge to the rear edge being of progressively less diameter to thereby permit the machine to advance against relatively solid material between the time that the advance edge of a blade engages the material and the time that the rear edge of the same blade passes rearwardly beyond the material being cut, and a cutting blade adjacent the advance edge and outer periphery of the aforesaid blades, and extended substantially parallel with the shaft.

DAVID G. CHASE.